H. H. GREGORY.
LIQUID METER.
APPLICATION FILED FEB. 26, 1913.
1,088,566.
Patented Feb. 24, 1914.
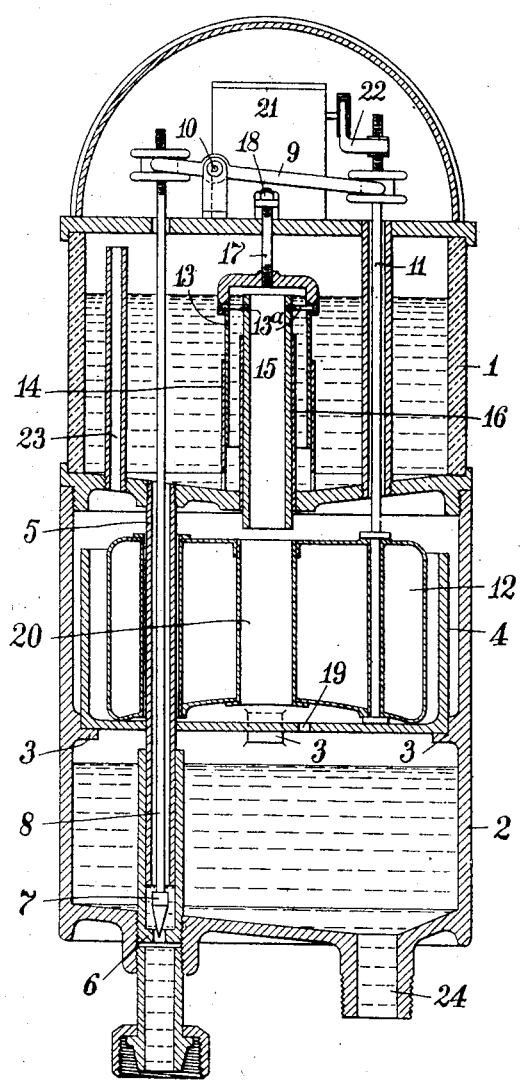
Witnesses:
Inventor
Hugh H. Gregory
by
Attorney

UNITED STATES PATENT OFFICE.

HUGH H. GREGORY, OF BARNES, ENGLAND, ASSIGNOR TO MOTOR EQUIPMENTS LIMITED, OF LONDON, ENGLAND, A CORPORATION OF GREAT BRITAIN.

LIQUID-METER.

1,088,566.  Specification of Letters Patent.  Patented Feb. 24, 1914.

Application filed February 26, 1913. Serial No. 750,935.

*To all whom it may concern:*

Be it known that I, HUGH HAMILTON GREGORY, a subject of the King of Great Britain, residing at Barnes, Surrey, England, have invented a new and useful Improved Liquid-Meter, of which the following is a specification.

This invention is for improvements relating to liquid meters and has reference more particularly to meters for registering the quantity of liquid fuel used in internal combustion engines.

My improved meter is of the type in which the liquid enters a chamber of the meter through a valved inlet controlled by a float and is discharged periodically from said chamber through a siphon.

According to my invention the container or chamber into which the liquid is delivered from the first named or measuring chamber by the siphon is furnished with a free outlet.

The invention comprises means for regulating the quantity of liquid periodically discharged from the measuring chamber at each operation of the siphon for the purpose of calibrating the meter.

The invention also comprises novel means for temporarily trapping the first portion of the liquid discharged by the siphon for a purpose hereinafter explained.

The accompanying drawing illustrates in vertical section a meter constructed according to the present invention.

The meter comprises a measuring chamber 1 mounted on a container 2, furnished with brackets 3 for carrying a cup 4. The inlet pipe 5 leading to the measuring chamber has a valve seat 6 adapted to be closed by a needle valve 7. The stem 8 of this needle valve extends through the measuring chamber and is operatively connected by means of an arm 9 pivoted at 10 and a rod 11 to a float 12 situated in the cup 4.

The measuring chamber is provided with a siphon for discharging the liquid into the container. This siphon comprises an outer bell 13 slidably mounted in a fixed sleeve 14 and an inner discharge pipe 15 slidably mounted in a fixed tube 16. The discharge pipe 15 and bell 13 are connected by pins 13ª. The height of the bell can be adjusted for example by means of a screw threaded rod 17 extending through an aperture in the top of the measuring chamber, and adjusting nuts 18 bearing on the top of said measuring chamber. The pipe 15 discharges into the cup 4 which has a small outlet orifice 19 in the bottom thereof for a purpose hereinafter described and the float has a through passage 20 arranged in line with the discharge pipe 15. A counter 21 of any suitable construction is provided and operated by an arm 22 carried on the rod 11 to count the number of discharges of liquid from the measuring chamber into the container 2.

The container communicates with the upper portion of the measuring chamber by means of a stand pipe 23 so that the air can pass freely from one to the other.

24 is the outlet from the container.

The operation of the meter is as follows:—
As the liquid is drawn off from the container the level gradually falls until it reaches a level below that of the orifice 19 in the cup 4 whereupon the float pulls down the stem 8 of the needle rod 11 and raises the stem 8 of the needle valve 7 thus allowing the liquid to enter the measuring chamber through the inlet pipe 5. The liquid will continue to flow into the measuring chamber until its level rises sufficiently to start siphonic action in the siphon situated in the measuring chamber whereupon the contents of the measuring chamber will be discharged into the cup 4 and will overflow into the container. The first part of the discharge causes the float to rise and operates the counter 21 and also the needle valve 7 to shut off further supply of liquid to the measuring chamber. As the liquid passes out of the container that contained in the cup 4 escapes through the orifice 19 until the cup is emptied whereupon the series of operations above described is repeated.

The quantity of liquid which will be discharged from the measuring chamber can be regulated by adjusting the height of the bell 13 of the siphon by means of the adjusting nuts 18, and the meter may thus be calibrated.

I claim:

1. In a liquid meter the combination of a measuring chamber having an inlet, a valve for controlling said inlet, a container having a free outlet, a siphon for periodically discharging the liquid from the measuring chamber into the container, a float situated in the container for controlling the inlet valve of the measuring chamber and a cup which surrounds the float and into which the liquid is discharged by the siphon the said cup having an outlet orifice, for the purpose set forth.

2. In a liquid meter the combination of a measuring chamber having an inlet, a valve for controlling said inlet, a container having a free outlet, a siphon for periodically discharging the liquid from the measuring chamber into the container, a float situated in the container for controlling the inlet valve of the measuring chamber, a counter also operated by said float and a cup which surrounds the float and into which the liquid is discharged by the siphon, the said cup having an outlet orifice, for the purpose set forth.

3. In a liquid meter, the combination of a measuring chamber having an inlet, a valve for controlling said inlet, a container having a free outlet, a siphon for periodically discharging the liquid from the measuring chamber into the container, a float situated in the container for controlling the inlet valve of the measuring chamber, a counter also operated by said float, a cup which closely surrounds the float and into which the liquid is discharged by the siphon, the said cup having an outlet orifice, and means for regulating the quantity of liquid discharged from said measuring chamber, for the purpose set forth.

HUGH H. GREGORY.

Witnesses:
GEORGE HARRISON,
GEORGE DONALD HARRISON.

Copies of this patent may be obtained for five cents each, by addressing the "Commissioner of Patents, Washington, D. C."